United States Patent [19]
Ladyjensky

[11] Patent Number: 5,824,242
[45] Date of Patent: Oct. 20, 1998

[54] CHEMILUMINESCENT SOLUTION

[75] Inventor: Jacques Ladyjensky, Brussels, Belgium

[73] Assignees: Prolufab S.A.R.L., Argenteuil, France; Chemical Light Technologies Inc., Johnston, R.I.

[21] Appl. No.: 945,402

[22] PCT Filed: Mar. 26, 1996

[86] PCT No.: PCT/BE96/00034

§ 371 Date: Sep. 30, 1997

§ 102(e) Date: Sep. 30, 1997

[87] PCT Pub. No.: WO96/30461

PCT Pub. Date: Oct. 3, 1996

[30] Foreign Application Priority Data

Mar. 31, 1995 [BE] Belgium .................................. 9500289

[51] Int. Cl.$^6$ ...................................................... C09K 3/00
[52] U.S. Cl. .............................................. 252/700; 362/34
[58] Field of Search ................................ 252/700; 362/34

[56] References Cited

U.S. PATENT DOCUMENTS

| Re. 35,007 | 8/1995 | Cohen et al. | 252/700 |
| 3,994,820 | 11/1976 | Maulding et al. | 252/700 |
| 4,016,133 | 4/1977 | Hyosu et al. | 526/273 |
| 4,379,320 | 4/1983 | Mohan et al. | 362/34 |
| 4,859,369 | 8/1989 | Baretz et al. | 252/700 |
| 4,911,830 | 3/1990 | Bromley et al. | 252/301.16 |
| 5,122,306 | 6/1992 | Van Moer et al. | 252/700 |

*Primary Examiner*—Philip Tucker
*Attorney, Agent, or Firm*—Pillsbury Madison & Sutro LLP

[57] ABSTRACT

A solution for causing a chemiluminescent reaction after it has been mixed with another per se known solution. The solution includes a solvent, an oxalate, a fluorescent dye and a polymer. The dye is rubrene and the polymer is advantageously polyoxyethylene. The chemiluminescent reaction produces a color having a greater stability over time. Adding a polymer incorporating a second red fluorescent dye enables a redder color to be achieved than when rubrene is the sole fluorescent dye.

10 Claims, No Drawings

CHEMILUMINESCENT SOLUTION

This application is the national phase of international application PCT/BE96/00034, filed Mar. 26, 1996 which designated the U.S.

The present invention is directed to a particular improvement to solutions and methods employed for obtaining light based on well-known phenomena derived from the peroxyoxalate-based chemiluminescence.

The chemiluminescence resulting from the reaction between a peroxalate and hydrogen peroxide with a fluorescent dye constitute a classical technique which has been extensively developed. Generally the oxalate is trichloropentoxyphényl oxalate in an organic solvent. A catalyst is provided in the hydrogen peroxide solution which will be mixed with the oxalate-dye system when the chemiluminescent reaction must start.

The fluorescent dyes which have been mostly employed up to now are phenylethynylanthracene (and its chlorinated derivatives) which produce a green or yellow-green chemiluminescence, diphenylanthracene and its chlorinated derivatives, which provide a blue or indigo chemiluminescence, and some derivatives of perylene which provide red or pink chemiluminescence.

The use of rubrene (tetraphenylnaphtacene) as a dye has been mentioned from the start of the above cited developments. There has been reported in that time that rubrene will provide a particularly strong orange chemiluminescence with an emission intensity, in terms of lumens per liter -all other parameters being equal -, of the order of twice the one obtained with the 1-chloro phenylethynylanthracene fluorescent dye which is itself the most performing of those cited above.

Unfortunately, rubrene dye exhibits a lack of stability and a rapid degradation is observed in the presence of hydrogen peroxide, which must be added to trigger the chemiluminescent reaction.

Under classical conditions, after at most 30 to 40 minutes, the color of the emitted light turns from orange to yellow, then to pale yellow and becomes colorless. These transitions are each time coupled with a lowering of the intensity of the light emission and are followed by an irreversible extinction.

The other dyes cited above which are generally employed in the prior art, stay stable during numerous hours and, generally, beyond the limit of consumption of the peroxyoxalate itself.

In the prior art, the lack of stability of rubrene has been repeatedly mentioned and deplored, the more so since rubrene constitute by far the most luminous fluorescent dye among those known in the chemiluminescence art. To the knowledge of the applicants, no rubrene-containing product is commercially available, except perhaps for minor applications where a light of a few minute duration would be satisfactory.

Furthermore U.S. Pat. No. 3,994,820 discloses and claims the fact that adding a polymer, for example polyoxyethylene, may generally increase the light capacity of a fluorescent dye (number of lumens.hours per liter). The cited dyes are more particularly bis phenylethenyl anthracene (the only one where experimental results are provided), perylene and rubrene. The examples illustrate the increased light capacity via an increase of the light intensity.

It is not mentioned or suggested therein that rubrene exhibits a favorable and surprising behavior in regard of the repeatedly cited disadvantages mentioned in the prior art in connection with its stability during the chemiluminescent reaction.

It is important to note that any effect of the additive on the dye stabilization - or if preferred on the non-disappearance of the dye - during the duration of the reaction is left undisclosed in these publications and in the above U.S. patent. Only an improvement of the light emission capacity is mentioned.

Now the major inconvenience attached to rubrene solutions is, as already noted above, the fact that the dye is degraded within half an hour of reaction time. For rubrene solutions, an improvement of the light capacity has therefore no more sense after this first half an hour, that is to say for most commercial applications. The examples provided in the above patent are concerned with dyes differing from rubrene. To our knowledge, after 20 years, nobody has up to now used this type of additive in order to allow the commercial use of rubrene solutions able to be activated during several hours.

It has now been surprisingly found that the stability of rubrene is substantially improved by the presence of polymer of the polyoxyalkylene type, or equivalent polymers, preferably at least partially solubilized, in order to allow their use in commercial devices.

In contrast to what was suggested in the prior art, in the particular case of rubrene the initial light intensity is not essentially above the one observed with the dye without polymer, but one the other side the said luminosity, according to the invention, is stable for a far longer period of time, compared to the one observed with classical dyes. The orange color will be maintained during several hours rather than a few tens of minutes of emission.

With rubrene, the reaction may be maintained up to the complete consumption of the oxalate. The polymer according to the invention will exercise a protecting effect against rubrene degradation by hydrogen peroxide when such a protection is not necessary for other fluorescers.

Preferably, molecular weight of the polyoxyethylene polymer (or polyethylene glycols) will be comprised between 1,000 and 1,000,000, more preferably from 50,000 to 300,000. The polymer is advantageously present in quantities corresponding to 0,05 to 5% by weight, more particularly from 0.1 to 1%.

A particularly suitable polymer is polyoxyethylene of an average molecular weight of around 200,000.

The invention include also for said rubrene solutions, means for making more valuable the observed stability of the obtained chemiluminescence, by affording a color with an emission in the red-orange, in place of orange. It is well-known indeed that the requirements of the market place for red chemiluminescent dye is not met.

There is only one commercial satisfactory red formula, that is to say the one based on substituted perylene as claimed in European patent 0,403,809 (Belgian priority of 20 Jun. 1989) which provide a pure red ("signal red") chemiluminescence, but at a high cost.

Another approach was used for the obtention of a light color close to red. This is described in U.S. Pat. No. 4,379,320. According to this document, the walls of the container are tinted with a red fluorescent dye, and the container is filled with a non-red chemiluminescent solution, emitting in a shorter wave length.

One major drawback connected with this process is that the industrial user is compelled to buy or manufacture molded containers specially made for these red light producing articles, this in addition to the usual stock of standard containers with non colored walls used for producing the other colors. Another drawback resides in the impossibility to obtain in a simple way such articles, for example luminous tricolored necklaces, for which successive ampules adapted each for a different chemiluminescent color are locate behind a single non colored wall in plastic material.

In the absence of pure red, the market will recognize the value of an orange solution such as provided by the present invention, but it will further appreciate a solution emitting in the red-orange color according to a particular embodiment of the invention.

For this purpose, still according to the invention, there is added in suspension, to the chemiluminescent rubrene solution with the soluble polymer as described above, a quantity of 2 to 40% by weight of a powder polymer containing dyes able to provide a red fluorescence, said dye forming a solid solution with said powder polymer.

Such powder solid solutions are commercially known: they emit a red fluorescence light under the action of daylight or any other common light. The dyes present therein exhibit no fluorescence property able to be used as such in chemiluminescent reactions with peroxyoxalates, otherwise there would have been used for long for such purposes. The commercial use as solid solutions in ground polymer for emission in the red under the influence of the ambient light, has always been done, up to now, by incorporating them in varnishes, paints, inks, plastic material to be molded or other similar matrix.

According to the present invention, such solid solutions are not used as usual. They will not receive any lighting. In suspension in the chemiluminescent liquid substrate, they will receive only the surrounding chemiluminescent orange emission, provided by rubrene. There is noted that they re-emit in the red with an intensity such that the resultant color shade with the eyes of an observer is very intense red-orange, and no more orange, as it is the case with rubrene taken alone.

One should note that the above observation seems not to be the result of the action of a red filter, or red mask, which would be transparent only to the red component of the orange light while blocking the yellow component. In the latter case, the intensity of the filtrated color would be substantially decreased relatively to the basic orange light. This is not so: the perceived red-orange light is intense and of the same order of magnitude that the perceived orange light with rubrene taken alone. There is therefore a pronounced synergistic effect.

Powders that may be used according to the invention are varied but the preferred polymers will most often be resins of the urea-formaldehyde type, or resins based on melamine-formaldehyde, sulfonamide, glycerophthalate, vinylic, acrylic, acrylonitrile and polyester polymers.

The red fluorescent dyes (generally present at concentrations of e.g. 1 to 6% by weight) which are dissolved in the resins are advantageously chosen among xanthines, coumarines and naphtalimides. These powders are commercially available and are produced in Europe, Canada, United States and Japan. These powders are generally of a granulometry varying from 1 to 25 micrometers. Their solubilities in the solvents generally used in chemiluminescent reaction, such as butyl phthalate, dimethyl phthalate, or butyl benzoate, is weak, e.g. less than 4 g per liter. Thus the invention uses a suspension, and one should take care of the fact that the granulometry must be sufficiently fine in order to avoid sedimentation of the end product.

Among the powders for the fluorescent red solid polymer solutions which are available, the following products (trade names or trademarks) may be taken into consideration - at different degrees - for their use in the present invention: Radglo K,R, P, JST; Holcolor HC; Deifel Leuchtrot, Radiant-Magruder TI,P,JS,R,K,MP ; U. Min. & Chem. Co FG, FB, NP, FC, FH, FAE; Epocolor FR, MA; Sinloihi F, FZ, FA, FR, FM, SB; Dayglo K, R, P, JST.

The following comparative examples illustrate the present invention, without limiting such in any way:

EXAMPLE 1

To 850 ml of dibutyl phtalate heated to 140° C. and purged with nitrogen, 108 g of bis(2,4,5 trichloro-6-carbopentoxy phenyl)oxalate and 3.8 g of rubrene are added, with mixing until dissolution. The mixture is cooled to 85° C., temperature at which there is added 150 ml of butyl hexanoate as co-solvent.

A mixture of 80 parts by volume of dimethylphthalate and 20 parts of t-butanol is prepared, in which 25 g of hydrogen peroxide and 60 mg of potassium salicylate are dissolved. This solution is the activator.

In order to initiate the chemiluminescence, 1 part by volume of the activator is mixed to 3 parts of a colored solution in a usual borosilicate glass container, preferably a beaker of around 50 ml.

A strong initial light emission of orange color is observed, which, about 10 minutes later, becomes yellow, then after 15 or 20 minutes, becomes paler, while still becoming more and more clear yellow and less luminous. After 30 to 40 minutes, extinction is practically reached.

EXAMPLE 2

To 850 ml of dibutyl phtalate heated to 140° C. and purged with nitrogen 108 g of bis(2,4,5 trichloro-6-carbopentoxy phenyl)oxalate and 3.8 g of rubrene are added, with mixing until dissolution. The mixture is cooled to 85° C., temperature at which there are added 4 g of polyoxy-ethylene of mw of 200,000 together with 150 ml of butyl benzoate as co-solvent. The temperature is maintained while mixing is continued until dissolution.

As in example 1, an activator solution is prepared with identical composition and the chemiluminescent reaction is initiated by mixing both solutions in the same proportion of 1 to 3.

A strong initial light emission of orange color is observed, the intensity being essentially the same as the one observed in example 1. Around 10 minutes later, the observation preferably performed by comparison and in the direct neighborhood of the sample of example 1 - indicates that the color has maintained the orange hue without variation. After 15 or 20 minutes, the light intensity has indeed decreased but substantially to a lesser extent than the one of the sample of example 1.

The orange color is maintained. Observations performed after 1 hour, 2 hours and so on each hour up to 15 hours, lead to the conclusion that the light maintain a orange color and that the intensity decreases slowly and regularly up to the extinction after the 15th hour, while in example 1 this regular decrease led to extinction after one half-hour.

EXAMPLE 3

To 850 ml of dibutyl phtalate heated to 140° C. and purged with nitrogen 108 g of bis(2,4,5 trichloro-6-carbopentoxy phenyl)oxalate and 3.8 g of rubrene are added, with mixing until dissolution. The mixture is cooled to 85° C., temperature at which there are added 4 g of polyoxy-ethylene of mw of 200,000 together with 150 ml of butyl benzoate as co-solvent and 8 g of the product Raglo K-15 from Radiant-Color N.V. (Houthalen, Belgium). This product is a solid solution of xanthene and coumarine dyes in a matrix of polyester resin powder.

As in example 1, an activator solution is prepared with identical composition and the chemiluminescent reaction is initiated by mixing both solutions in the same proportion of 1 to 3, and again comparative observation are run taking care in this case to use identical transparent containers.

A strong initial light emission of orange color is observed, the intensity being essentially the same as the one observed in examples 1 and 2. However the observed color in place of being of orange shade (hue) is of "red-orange" shade. Certain grown-up observers will qualify it as "clear red", "vermilion red" or "fire red"; others will simply mention "red orange". For children having not yet acquired experience of slight shades, the color will be qualified as frankly "red".

The difference in the shade in comparison with the examples 1 and 2 does not leave doubt and is in the direction of a shift towards the red.

The profile of the light intensity with time, between 0 and 15 h of duration from the start, is somewhat the same as in example 2, with possibly a slightly weaker light intensity - which will be hardly noticeable for the average observer. This shade is maintained until extinction.

I claim:

1. A solution for producing, after mixing with another solution known per se, a chemiluminescent reaction, said solution containing a solvent, an oxalate, rubrene and a soluble polymer characterised in that the solution contains also 2 to 40% by weight of a suspension of a powder polymer which is weakly or not at all soluble and in which a red fluorescer has been incorporated.

2. Solution according to claim 1 characterised in that the soluble polymer is a soluble polyoxyalkylene.

3. Solution according to claims 1 characterised in that the soluble polymer is polyoxyethylene.

4. Solution according to claim 1 characterized in that the molecular weight of the soluble polymer varies from 20,000 to 400,000.

5. Solution according to claim 1 characterized in that the molecular weight of the soluble polymer is above 50,000.

6. Container for producing chemiluminescent light characterised in that it comprises at least two separated solutions located in compartments, able to be mixed if desired by the user, one compartment at least comprising a solution according to claims 1, and at least one compartment comprising a hydrogen peroxyde solution with a catalyst.

7. Chemiluminescent solution comprising an organic solvent, a bis oxalate, rubrene and hydrogen peroxide and possibly a catalyst characterised in that it comprises also a soluble polymer and, in suspension, a powder of insoluble polymer wherein a red fluorescer is incorporated.

8. Solution according to claim 1 wherein the red fluorescer is chosen in the group consisting of xanthenes, coumarines and naphtalimides.

9. Solution according to claim 1 wherein the polymer powder is based on a resin of the urea-formaldehyde, melamine-formaldehyde, sulfonamide, glycerophthalate, vinylic, acrylic, acrylonitrile or polyester type.

10. Solution according to claim 1 wherein the polymer powder is of a granulometry varying between 1 and 25 micrometers.

* * * * *